April 7, 1970 R. B. DOME 3,505,610

SIMPLIFIED FM RATIO DETECTOR CIRCUIT

Filed Jan. 24, 1967

INVENTOR:
ROBERT B. DOME,

BY W. J. Shanley, Jr.
HIS ATTORNEY.

United States Patent Office 3,505,610

Patented Apr. 7, 1970

3,505,610

SIMPLIFIED FM RATIO DETECTOR CIRCUIT

Robert B. Dome, Geddes Township, Onondaga County, N.Y., assignor to General Electric Company, a corporation of New York Filed Jan. 24, 1967, Ser. No. 611,373

Int. Cl. H03d *3/00*

U.S. Cl. 329—129 4 Claims

ABSTRACT OF THE DISCLOSURE

An FM ratio detector circuit, including a simplified circuit for providing a phase shift between voltages in the primary and secondary circuits. A serially connected resonant circuit and R.F. choke effect the phase shift to produce the desired energizing signal voltages to rectifiers producing a demodulated output.

BACKGROUND OF INVENTION

In conventional ratio detector circuits a transformer arrangement has been included to produce the 90° phase shift in a secondary circuit necessary to obtain the desired energizing signal voltages applied to a pair of diodes which rectify the signal voltage to produce a demodulated output. This transformer arrangement has ordinarily consisted of an adjustable inductance primary winding, an adjustable inductance center-tapped secondary winding including a fixed shunt tuning capacitor and loosely coupled to the primary winding, and a tertiary winding tightly coupled to the primary winding and connected to the secondary center-tap. In some cases, a fixed shunt tuning capacitor across the primary winding is also provided. There are, thus, five terminals on such a transformer. While the operation of such a transformer has proved to be satisfactory, the advantages to be gained by effecting its function with fewer components and consequent reduction of expense are obvious.

SUMMARY OF THE INVENTION

It is therefore, an object of this invention to provide for a ratio detector a simplified and inexpensive circuit for providing the energizing signal voltages to be applied to the rectifiers producing the demodulated output.

In accordance with my invention in one form thereof, I provide a ratio detector circuit including an input for a source of FM R.F. signals connected to the center-tap of an inductor. The inductor is shunted by a fixed tuning capacitor to form a resonant LC circuit and its terminals are connected to a pair of diode rectifiers. One terminal of the inductor is connected to a D.C. supply through an R.F. choke. The R.F. choke serves to effect a desired 90° phase difference at resonance between the voltage across the inductor and the voltage present at the center tap. At resonance, the signal voltages applied to the diodes are thus equal in magnitude. But, since the phase relation between the voltage at the center tap and the voltage across the resonant circuit varies with frequency, the voltages applied to the diodes differ in magnitude in accordance with this frequency variation. Through a known arrangement, the output of the ratio detector circuit is obtained by deriving the modulation-frequency voltage variations from the diodes.

DESCRIPTION OF DRAWINGS

The invention may better be understood by the following detailed description taken in conjunction with the following drawings in which.

DETAILED DESCRIPTION

Figure 1:
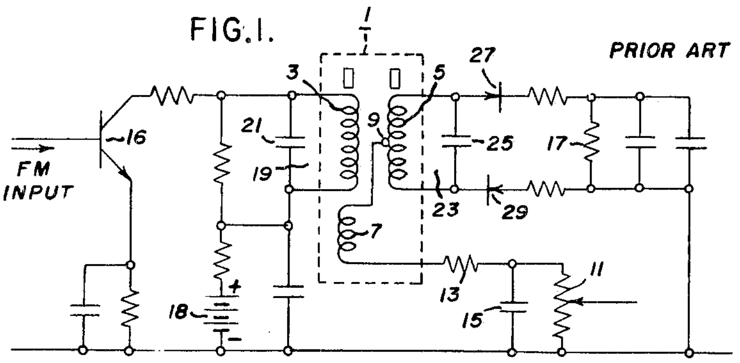
FIGURE 1 is a ratio detector circuit including the transformer arrangement of the prior art.

FIGURE 1 shows a ratio detector using a conventional transformer arrangement or discriminator to produce the desired phase shift. The discriminator transformer 1 (enclosed in the dotted lines) is made up of a primary winding 3 coupled loosely to a secondary winding 5. A tertiary winding 7 is tightly coupled to the primary 5 and is connected from a center-tap 9 on the secondary winding to an audio-volume control 11 through a small resistor 13. A capacitor 15 in conjunction with the resistors 11, 13 and the equivalent A.C. source resistance represented by the detector load circuit 17, form an RC time constant circuit to provide the deemphasis of 75 micro seconds required by FM transmission standards. The FM input is provided through a suitable transistor 16 which is energized by battery 18.

Figure 2:
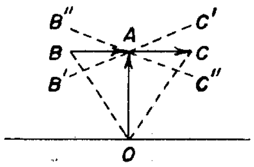
FIGURE 2 is a vector diagram depicting the energizing signal voltages applied to the diodes in the circuit in FIGURE 1.

The detector circuit transformer arrangement operates as follows: the primary circuit 19 comprising the primary winding 3 and shunting tuning capacitor 21 is tuned to the carrier frequency. The secondary circuit 23 comprising the secondary winding 5 and a shunting tuning capacitor 25 is also tuned to the FM carrier frequency. As can be shown by coupled circuit theory, the phase of the voltage across the secondary circuit 23 is 90° displaced from that across the primary circuit 19. The tertiary voltage, however, has the same phase as the primary circuit because the tertiary winding 7 is not tuned and is tightly coupled to the primary winding 3. The voltages applied to the two diodes 27 and 29, then, are the voltages from the extremes of the secondary winding 5 to ground and may be represented vectorally, as in FIGURE 2. The tertiary voltage is represented by vector OA. The secondary voltage is represented by vector BC with A being its midpoint, the equivalent of the center-tap 9. Thus, one diode has voltage vector OB while the other diode has voltage vector OC. Now, as the FM frequency varies during modulation, vector BC tilts in phase, assuming position B′C′ for positive half-cycles of audio modulation and B″C″ for negative half-cycles of audio modulation. The vectors OB and OC thus change lengths, yielding audio output variations detected by the diodes.

Figure 3:
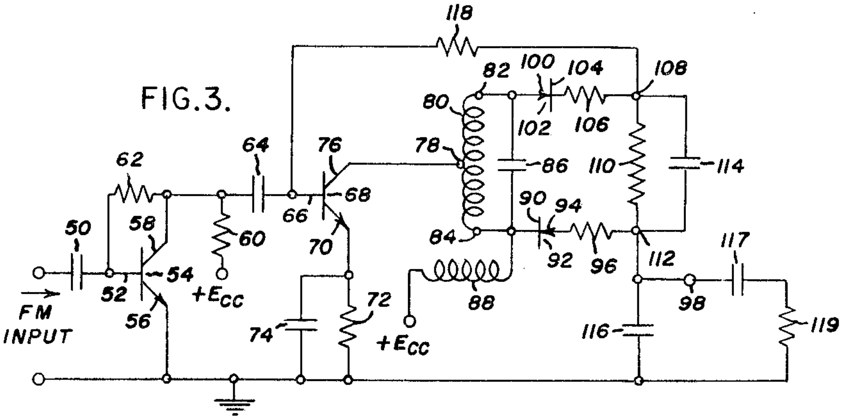
FIGURE 3 is the ratio detector circuit including the voltage phase shifting arrangement of the present invention.

FIGURE 3 represents the ratio-detector circuit of the present invention wherein the transformer arrangement of the prior art is eliminated and replaced by a novel and inexpensive phase shifting arrangement. In the present ratio detector circuit, the FM R.F. input signal is applied through a blocking capacitor 50 to the base 52 of an NPN transistor 54 whose emitter 56 is grounded. The collector 58 is connected to a suitable D.C. power supply *Ecc* through a load resistor 60 and its base 52 is biased by means of a suitable resistor 62 connected from the collector 58. The amplified signal appearing across the resistor 60 is coupled through a blocking capacitor 64 to the base 66 of a second NPN transistor 68 whose emitter 70 is connected to ground through a resistor 72. The resistor is by-passed for R.F. by a capacitor 74. The collector 76 of the second transistor 68 is connected to the center-tap 78 of an inductor 80, across the terminals 82, 84 of which is connected tuning capacitor 86. One terminal 84 of the inductor is connected to a D.C. supply E*cc* through an R.F. choke 88. The terminal 84 of the inductor 80 is also connected to the cathode 90 of a diode 92, the anode 94 of which is connected through a resistor 96 to an output terminal 98. The other terminal 82 of the inductor 80 is connected to the anode 100 of a second diode 102, the cathode 104 of which is connected through a suitable resistor 106 to one terminal 108 of a load resistor 110. The other terminal 112 of the load resistor 106 is connected to the output terminal 98. The audio-frequency by-pass capacitor 114 is connected across the load resistor so as to inhibit audio-frequency voltage fluctuations thereacross. A capacitor 116 is connected from the output terminal to ground and serves the dual purpose of R.F. by-pass and de-emphasis. A blocking capacitor 117 may also be included. The load is represented by resistance 119. A resistor 118 may be connected from the base 66 of the second transistor 68 to the junction of resistor 106 and load resistor 110 for biasing purposes. Alternatively, the resistor 118 may be connected from the base 66 of the second transistor 68 to the D.C. power supply E*cc* or to some other suitable power supply voltage.

Figure 4:
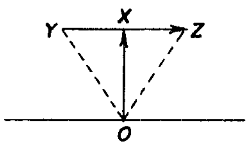
FIGURE 4 is a vector diagram of the energizing signal voltages applied to the diodes in the circuit in FIGURE 3.

In the ratio detector circuit of the present invention, the 90° phase shift to place the primary and secondary voltages in quadrature relation to each other is not obtained by inductive coupling, as in the prior art circuit of FIGURE 1, but by the interconnection of a reactance, represented by the R.F. choke 88 in FIGURE 3, and a resistance, represented by the resonant circuit comprising the inductor 80 and the shunting tuning capacitor 86. The vector diagram in FIGURE 4 shows a vector OX representing the phase of the voltage at the transistor collector 76 to ground. The collector 76 is tied at X to the center-tap 78 of the inductor 80 in the resonant circuit. The vector YZ represents the secondary voltage, established in quadrature relation to OX by the phase shift resulting from the series connection of the resistive resonant circuit of the inductor 80 and capacitor 86 and the reactance of the R.F. choke 88. The vectors OY and OZ represent the voltages applied to the two diodes 94 and 102. As the frequency varies, the phase angle varies between the voltage at the transitor collector 76 to ground and the voltage in the secondary circuit to cause vectors OY and OZ to vary, thereby producing audio variable energizing signal voltages at the diodes 92 and 102.

Actually, the series connection of the R.F. choke and the resonant circuit of the present invention cannot quite achieve a true 90° separation in phase. As a consequence the resonant circuit constituted by the inductor 80 and capacitor 86 may have to be slightly detuned to produce the FIGURE 4 vector diagram, but this in no way affects the desired end result of providing variable length voltage vectors OY and OZ for the diodes.

The R.F. choke 88 serves the dual purpose of providing a low resistance D.C. path for the collector current as well as providing for the proper quadrature voltage. In a sense, then, the R.F. choke 88 serves as a reactive coupling means. In this regard it has been found that the higher the reactance of the R.F. choke, the less the coupling and the less the bandwidth of the discriminator.

It has also been found that the magnitude of the audio voltage at the load terminal 98 is also affected by the magnitude of the reactance of the R.F. choke 88, there being a very broad peak in output for a certain range in value for the reactance in the R.F. choke. The bandwidth is also controlled by the loading resistor 110 and by the ratio of the inductor 80 to the shunting tuning capacitor 86. It is therefore possible to produce a circuit for optimum performance for a number of desired conditions because of the many controllable independent variables available. The resistors 96 and 106 are included in series with the diodes 92 and 102 respectively to lower the rectification efficiency to the point where the A.M. (amplitude modulation) rejection is satisfactory for downward modulation. The relationship $$\frac{\text{Resistance (96)}+\text{Resistance (106)}}{\text{Resistance (110)}}=0.2$$

will provide for A.M. of ±50%. Other numbers than 0.2 will protect for other desired A.M. percentages.

The ratio detector circuit of the present invention also serves to effectively limit against amplitude variations in the frequency-modulated wave. In the present circuit, limiting is effected by saturation of the two transistors 54 and 68 feeding the detector.

In FIGURE 3 the resistor 118 is returned to a variable voltage point, that is, for high inputs the base 66 current is increased automatically since the voltage drop across the loading resistor 110 increases with the signal. This adjustment permits operation over a wider input range without output variation and also adjusts conditions for a greater output at maximum signal conditions.

The transistors 54 and 68 used in the detector circuit are wide-band untuned amplifiers and require the use of low collector load resistance. In order to prevent low frequency gain the coupling condensers 50 and 64 are made low in capacitance. The transistors must also be protected against thermal runaway. This can be done by including resistors 60, 72 in the collector-emitter circuit of sufficiently high resistance value so as to preclude transistor dissipation in excess of that permitted by manufacturer's ratings no matter what operating conditions might obtain.

Figure 5:
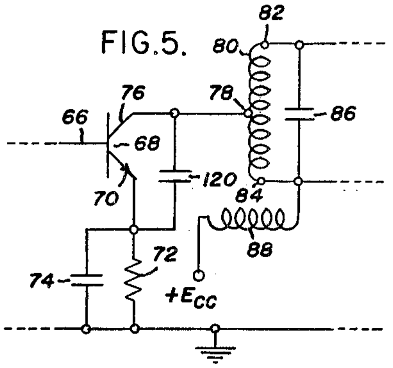
FIGURE 5 is a partial view of the ratio detector circuit of FIGURE 3 showing a modification of the subject invention.

FIGURE 5 shows a portion of the ratio detector circuit of FIGURE 3 in which a modification to the subject circuit is shown. This modification comprises the addition of a capacitor 120 connected from the collector 76 to the emitter 70 of the second transistor 68 to provide some relief from the low input resistance generally present when a transistor input circuit is used as the load for a previous stage. The value of the capacitances should be set so as to afford maximum gain for the system. For example, it has been found that, with the inclusion of a suitable capacitor 120, the gain was increased sufficiently so that the 90% output point was achieved with an input of about 9.6 mv. and 50% output was achieved at an input of about 3.6 mv. This result can be compared with the former values for these levels which were 30 mv. and 8 mv. respectively.

I have thus described a ratio detector circuit including a limiter for amplitude variations in the FM wave wherein an improved discriminator is provided to place the phase relation between the primary and secondary circuit voltages in quadrature. The limiting network includes a transistor, the collector of which is connected to the center-tap of an inductor shunted by a fixed tuning capacitor to form a resonant LC circuit. The inductor terminals are connected to a pair of diode rectifiers, and one terminal of the inductor is connected to a D.C. supply through an R.F. choke which serves to effect the desired phase shift. At resonance the signal voltage applied to the diodes will be equal in magnitude, but since the phase relation between the voltage at the transistor collector to ground and the voltage across the resonant circuit varies with frequency, the voltages applied to the diodes will differ in magnitude in accordance with this frequency variation so that the desired demodulated output can be produced.

Although the invention has been described with specificity, it is the aim of the appended claims to cover all such modifications as fall within the true spirit and scope of this invention.

What is claimed and is desired to be secured by Letters Patent of the United States is:

1. In a ratio detector, the improvement comprising:

(a) means to provide an electrical input signal;

(b) a parallel resonant circuit including a pair of output terminals and an input terminal intermediate the output terminals;

(c) said signal providing means being connected to said resonant circuit at the input terminal; and (d) a reactance connected to said resonant circuit at one of the output terminals thereof to effect a quadrature phase relation between the voltages in the signal providing means and in the resonant circuit.

2. The improved ratio detector as recited in claim 1 wherein the resonant circuit comprises an inductor winding and a shunting tuning capacitor, said inductor winding having a center-tap, and said signal providing means being connected to the center-tap of said inductor winding.

3. The improved ratio detector as recited in claim 1 wherein the reactance comprises an R.F. choke.

4. The improved ratio detector as recited in claim 1 wherein a pair of rectifiers are provided, one of said terminals for said resonant circuit being connected to one of said rectifiers and the other of said terminals of said resonant circuit being connected to the other of said rectifiers, and a rectifier output circuit coupled to said rectifiers for deriving modulation-frequency voltage variations.

References Cited

UNITED STATES PATENTS

| | | | |
|---|---|---|---|
| 2,496,818 | 2/1950 | Seely | 329—129 |
| 3,204,190 | 8/1965 | Broadhead | 329—129 |

ROY LAKE, Primary Examiner

L. J. DAHL, Assistant Examiner

U.S. Cl. X.R.

329—124